United States Patent
Deshpande

(10) Patent No.: US 7,965,639 B2
(45) Date of Patent: Jun. 21, 2011

(54) DYNAMIC ADAPTATION OF MAC-LAYER RETRANSMISSION VALUE

(75) Inventor: Sachin G. Deshpande, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 664 days.

(21) Appl. No.: 11/347,339

(22) Filed: Feb. 3, 2006

(65) Prior Publication Data

US 2006/0203729 A1 Sep. 14, 2006

Related U.S. Application Data

(60) Provisional application No. 60/661,719, filed on Mar. 14, 2005.

(51) Int. Cl.
*H04L 12/26* (2006.01)
(52) U.S. Cl. .................................................. 370/236
(58) Field of Classification Search ............ 370/236, 370/229, 235, 236.2, 241, 241.1, 242, 248; 709/230–231
See application file for complete search history.

(56) References Cited

U.S. PATENT DOCUMENTS

| | | | |
|---|---|---|---|
| 6,747,976 B1 | 6/2004 | Bensaou et al. | |
| 7,224,702 B2 * | 5/2007 | Lee ............................ | 370/473 |
| 2003/0112822 A1 | 6/2003 | Hong et al. | |
| 2003/0203740 A1 | 10/2003 | Bahl et al. | |
| 2004/0013102 A1 | 1/2004 | Fong et al. | |
| 2004/0081095 A1 | 4/2004 | Liu et al. | |
| 2004/0179523 A1 * | 9/2004 | Maruyama et al. ........... | 370/389 |
| 2006/0164987 A1 * | 7/2006 | Ruiz Floriach et al. ...... | 370/235 |
| 2006/0234644 A1 * | 10/2006 | Ludwig et al. .................. | 455/69 |

FOREIGN PATENT DOCUMENTS

| | | |
|---|---|---|
| WO | WO 03/030438 A1 | 4/2003 |
| WO | WO 03/063494 A1 | 7/2003 |
| WO | WO 2004/023736 A1 | 3/2004 |
| WO | WO 2004/057817 A2 | 7/2004 |

OTHER PUBLICATIONS

Leon-Garcia, Alberto and Widjaja, Ingrid, Communication Networks, 2003, McGraw-Hill, 2nd edition, pp. 300-309.*

* cited by examiner

*Primary Examiner* — Derrick W Ferris
*Assistant Examiner* — Omar Ghowrwal
(74) *Attorney, Agent, or Firm* — Michael Blaine Brooks, PC; Michael B. Brooks; David Ripma

(57) ABSTRACT

The number of audio/visual packets that are sent over a wireless channel of a wireless network and that are effectively lost at a client application is reduced by determining the number of packets that were effectively lost during a measurement period and by selecting at a server application a MAC-layer retransmission value that is based on the number of packets that are effectively lost during a measurement period. The number of packets that were effectively lost during the measurement period includes a total number of packets that were never received by the client application during the measurement period and a total number of packets that arrived after a corresponding deadline for a packet during the measurement period.

5 Claims, 9 Drawing Sheets

DYNAMIC ADAPTATION OF MAC-LAYER RETRANSMISSION VALUE

CROSS-REFERENCE TO RELATED APPLICATIONS

This application claims the benefit of U.S. Provisional Patent Application Ser. No. 60/661,719 filed Mar. 14, 2005, entitled "Dynamic Adaptation of Mac-Layer Re-transmissions Based on Deadline Aware Client Feedback," which is hereby incorporated by reference herein for all purposes.

BACKGROUND OF THE INVENTION

1. Field of the Invention

The present invention relates to wireless communication systems. More particularly, the present invention relates to a method for dynamically adapting the number of MAC-layer retransmission value(s) at a server based on client feedback.

2. Description of the Related Art

Audio/video (AV) streaming on home networks has seen increased industry interest in recent years. There are a number of networked AV products that are now available from the consumer electronics (CE) industry and the information technology (IT) industry aiming to support an entertainment quality AV experience over a home network. Wireless networks, complying with the IEEE 802.x standard, typically have the capabilities and network throughput to support AV stream bit-rates to offer an acceptable quality user experience.

Each AV packet has a deadline for the packet to be played or presented that typically depends on the application. For example, for low latency applications, such as two-way audio-video conferencing, the acceptable end-to-end delay is typically small (e.g., 150-400 msec). Any packet that arrives later than the small acceptable delay or deadline is considered to be effectively lost. As a contrasting example, a delay of several seconds may be acceptable for a packet in a one-way streaming media application because each arriving packet is buffered and the media playback or playout or presentation is started after a predetermined amount of data has been buffered. The deadline may be based on various factors, such as the available client buffer size, and user preference. The playback deadline includes presentation and playout deadline of packets.

When a packet is received after the deadline for the packet has passed, the packet is considered to be "effectively lost," and such packet is herein also referred to as a "late packet." There are some existing techniques that utilize or rely in part on a late packet for correcting and restricting error propagation in media frames that will be rendered in the future. The packet, however, is not typically rendered if the deadline for the packet has passed.

A wireless channel poses several challenges for AV streaming that should be overcome in order to achieve a satisfactory experience for a user because a wireless channel is unreliable and packets may become lost. The challenges may include handling lost, re-ordered and duplicate packets. Packet loss may be handled at various levels in the network stack. For example, protocols, such as transmission control protocol (TCP), may provide end-to-end reliable packet transport albeit at the expense of delay. TCP, however, may not provide the best option for streaming AV data in the case of a wireless channel having a rapidly fluctuating bandwidth because each packet of AV streaming media typically has a deadline after which delivery of the packet is not useful. In such situations, using user datagram protocol (UDP) and other protocols, such as real-time transport protocol (RTP) on top of UDP, may provide a better overall solution and improved streaming performance. The media access control (MAC) layer may support retransmissions in the case when packets are lost. In the case of an IEEE 802.11-based network, network cards typically support different number of MAC retransmission values to handle wireless packet loss. See, for example, ANSI/IEEE Standard 802.11, "Part 11: Wireless LAN Medium Access Control (MAC) and Physical Layer (PHY) Specifications," 1999, and ANSI/IEEE Standard 802.11b, "Part 11: Wireless LAN Medium Access Control (MAC) and Physical Layer (PHY) Specifications: Higher-Speed Physical Layer Extension in the 2.4 GHz band," 1999. MAC retransmissions may reduce the number of lost packets, but may also result in packet delays. Consequently, depending upon the application, the packet deadline may result in late packets being considered effectively lost.

Performance analysis and modeling of errors and losses over local area networks (LANs), such as an 802.11b LAN for high-bit-rate real-time multimedia are disclosed by S. Khayam et al., "Performance analysis and modeling of errors and losses over 802.11b LANs for high-bit-rate real-time multimedia," Signal Processing: Image Communications, Volume 18, Issue 7, August 2003. Experimental measurements of REALMEDIA™ audio/video streaming applications on an IEEE 802.11b wireless LAN are disclosed by T. Kuang et al., "RealMedia Streaming Performance on an IEEE 802.11b Wireless LAN," Proceedings of IASTED wireless and Optical Communications (WOC) Conference, Canada, pp. 306-311, July 2002. T. Kuang et al. also disclose the relationship between the wireless channel error rate and the user-perceived quality of streaming applications.

An improvement to the Auto Rate Fallback (ARF) algorithm for both short-term and long-term adaptation is disclosed by M. Lacage et al., "IEEE 802.11 Rate Adaptation: A Practical Approach," Proceedings of the 7th ACM/IEEE International Symposium on Modeling, Analysis and Simulation of Wireless and Mobile Systems, Italy, Oct. 46, 2004. An analysis and modeling of errors at the 802.11b link layer are disclosed by S. Karande et al., "Analysis and modeling of errors at the 802.11b link layer," IEEE International Conference on Multimedia and Expo (ICME), July 2003. S. Sharma, "Analysis of 802.11b MAC: A QoS, Fairness, and Performance Perspective," e.g., the World Wide Web at ecsl.cs.sunysb.edu/tr, particularly the file wlanrpe.pdf, discloses that the Medium Access Controller for 802.11b networks is a prime area for quality of service (QOS), fairness, performance, and security improvements. Additionally, S. Sharma et al. disclose an intelligent collision avoidance scheme for enhancing MAC, to address some of the performance issues in 802.11b and similar networks.

In many situations, the deadlines for AV packets are typically controlled on the client side. For example, for one-way streaming media, the client may have a memory constraint that determines its buffer size, which, in turn, determines when playback or presentation of the packets begins. Similarly, a client application may enable a user to configure a parameter that specifies the amount of delay the client is willing to wait (buffering time) before playback or presentation begins. Alternatively, the client may automatically set the playback deadline based on the type of communication (e.g., one-way as opposed to two-way). Additionally, the client may dynamically change the playout or playback deadline if the client is employing a technique, such as adaptive media playout.

According to IEEE standard 802.11b, the MAC Distributed Co-ordination Function (DCF) uses an acknowledgment (ACK) frame for immediate positive acknowledgment that a MAC frame has been correctly received. See, for example, ANSI/IEEE Standard 802.11b, "Part 11: Wireless LAN Medium Access Control (MAC) and Physical Layer (PHY) Specifications: Higher-Speed Physical Layer Extension in the 2.4 GHz band," 1999. When no acknowledgment is received shortly after transmission, the sender resends the packet, which is repeated until an ACK is received or until the maximum retransmission threshold number is reached.

Thus, methods, devices, and/or systems are needed to reduce the number of packets that is lost and arrives late at a client application, when compared to the related art.

BRIEF SUMMARY OF THE INVENTION

The present invention provides methods, devices, and systems that dynamically adjust the MAC-layer retransmission value at a server application and/or device in order to minimize the number of packets that is lost and arrives late at a client application and/or device.

For example, the present invention provides a method for reducing a number of effectively lost audio/video packets at a client application, the packets may be sent over a wireless channel that is, for example, part of an IEEE 802.11b-based wireless network. The audio/video packets may be part of a two-way audio-video conferencing application, or part of a one-way streaming media application. According to exemplary embodiments of the present invention, an indication is sent from a server application to the client application that indicates a start of a measurement period. In one exemplary embodiment of the present invention, the end of a current measurement period is indicated by the start of a subsequent measurement period. In another exemplary embodiment, the duration of a measurement period is based on a predetermined number of packets being sent from the server application to the client application. Information is received typically from the client application that relates to a number of packets that were lost during the measurement period. A MAC-layer retransmission value may be selected at the server application and that value may be based on the number of packets that were effectively lost at the client during the measurement period. The number of packets that were effectively lost during the measurement period typically includes a total number of packets that were never received by the client application during the measurement period and a total number of packets that arrived after a corresponding deadline for a packet during the measurement period. The information received from the client application may be received after an end of the measurement period. Alternatively, the information received from the client application may be received during the measurement period.

In one aspect, an embodiment of the invention provides for a method of reducing lost packets within a system that includes a client and a server operably coupled by at least one network segment. The method includes the steps of performing at least one measurement test phase, wherein each of the at least one measurement phase is associated with a respective test MAC-layer retransmission value from a plurality of test MAC-layer retransmission values; receiving, from the client, feedback information for each of the at least one measurement phase, wherein each of the feedback information is associated with a respective measurement phase from the at least one measurement phase, and wherein the feedback information is related to packets lost during the associated measurement phase; and determining, for the server, a MAC-layer retransmission value selected from the plurality of test MAC-layer retransmission values, based on the received feedback information.

In another aspect, an embodiment of the invention provides for a method of reducing lost packets within a system that includes a client and a server operably coupled by at least one network segment. The method includes the steps of performing at least one measurement test phase, and each of the at least one measurement phase is associated with a respective test media access control (MAC)-layer retransmission value from a plurality of test MAC-layer retransmission values; gathering, at the client, information for each of the at least one measurement phase, wherein each of the gathered information is associated with a respective measurement phase from the at least one measurement phase, and wherein the gathered information is related to packets lost during the associated measurement phase; and assigning, at the server, a MAC-layer retransmission value selected from the plurality of test MAC-layer retransmission values and resulting in a fewest number of packets lost based on the gathered information.

In another aspect, an embodiment of the invention provides for a system that includes a server, a client, and at least one network segment. The client operably coupled to the server via the network segment. The server is adapted to transmit packets during a measurement phase. The measurement phase is typically associated with a respective test MAC-layer retransmission value from a plurality of test MAC-layer retransmission values. The server is also adapted to receive feedback information associated with a respective measurement phase, wherein the feedback information is related to packets lost at the client during the associated measurement phase. The server is also adapted to determine an updated MAC-layer retransmission value based on the received feedback information with a fewest number of packets lost during an associated measurement phase, and to transmit data packets based on the determined updated MAC-layer retransmission value. The client, on the other hand, typically is adapted to gather feedback information related to packets transmitted by the server. The gathered information typically includes a total number of packets never received by the client during an associated measurement phase. The client is also adapted to transmit the gathered feedback information.

In another aspect, an embodiment of the invention provides for a server device that is adapted to be operably coupled to a client via at least one network segment. The server device includes a transmitter that is adapted to transmit packets during a measurement phase and transmit data packets based on a determined updated MAC-layer retransmission value. The measurement phase is typically associated with a respective test MAC-layer retransmission value from a plurality of test MAC-layer retransmission values. The server device also includes a receiver that is adapted to receive feedback information associated with a respective measurement phase, wherein the feedback information is related to packets lost at the client during the associated measurement phase. The server device further includes a controller that is adapted to determine the updated MAC-layer retransmission value based on the received feedback information with a fewest number of packets lost during an associated measurement phase.

In another aspect, the invention provides for a client device that is adapted to be operably coupled to a server via at least one network segment. The client device includes a receiver, a controller, and a transmitter. The receiver is adapted to receive packets during a measurement phase. The measurement phase is typically associated with a respective test MAC-layer retransmission value from a plurality of test MAC-layer retransmission values. The controller, on the other hand, is adapted to gather feedback information related to the received packets transmitted by the server, wherein the gathered information includes a total number of packets never received by the client during an associated measurement phase; while the transmitter is adapted to transmit the gathered feedback information.

BRIEF DESCRIPTION OF THE DRAWINGS

The present invention is illustrated by way of example and not by limitation in the accompanying figures in which like reference numerals indicate similar elements and in which.

DETAILED DESCRIPTION OF THE INVENTION

The embodiments of the present invention provide dynamic adaptation of the number of the Medium Access Control (MAC)-layer retransmissions based on one or more deadline-aware client feedback transmissions. An exemplary method of the present invention is primarily designed for audio/video (AV) streaming applications over IEEE 802.11b-based wireless networks. The embodiments of the present invention, however, may also apply to wired—wire-line, and other wireless networks, including IEEE 802.11 a, and g. The embodiments of the present invention also enable a server side application or device to set the number or value of MAC-layer retransmissions based on client application needs. Accordingly, the exemplary embodiments of the present invention accommodate applications having different latency requirements, such as one-way or two-way streaming media applications. Furthermore, the embodiments of the present invention provide a lower number of data packets that are "effectively lost," where the term "effectively lost" includes packets actually lost, i.e., never received by the receiver, and late packets, i.e., packets deemed to have arrived too late to be included with other related packets.

More specifically, the several exemplary embodiments of the present invention may provide server-side signaling in order to indicate to the client the boundaries of a measurement test phase, e.g., when a measurement phase starts and ends. In response, the client side may perform a client-side measurement of lost and late packets. Client-side feedback relating to the lost and late packets may then be sent to the server side. In response to the client-side feedback, the server side adjusts the number of MAC-layer retransmissions on the server side, typically based on the current channel conditions and feedback provided by a client about current playout deadlines of the client to obtain optimum performance.

Figure 1:
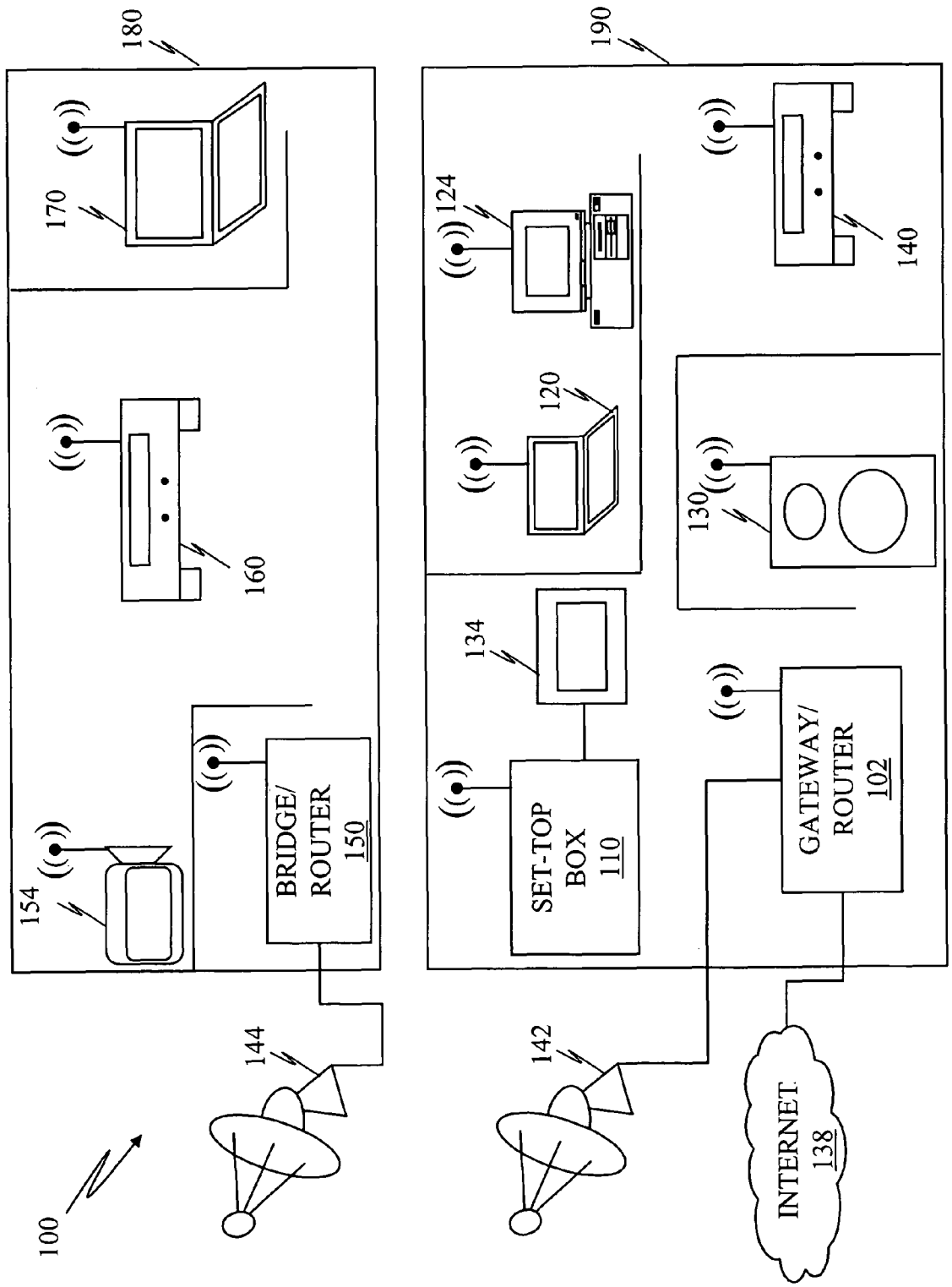
FIG. 1 is an exemplary network system incorporating the dynamic adaptation techniques according to exemplary embodiments of the present invention.

FIG. 1 is an exemplary system architecture 100 wherein the exemplary embodiments of the present invention may be employed. This exemplary system 100 includes two local area networks (LANs) 180, 190 that are deployed over two regions or infrastructures, such as two buildings or homes. The first LAN 190 includes a gateway/router 102 that is operably coupled to the Internet 138 or a wide area network, via a wired or wireless medium. The wireless devices in the first LAN 190 include several devices including a set-top box 110 that is operably coupled to a television or monitor 134, a laptop 120, a desktop computer 124, a stereo/radio 130, and a digital media player 140. The second LAN 180, on the other hand, includes several devices including a bridge/router 150, a video camera 154, a digital media server 160, and a computer 170. Wired devices, for example, a computer operably coupled to the network via wired Ethernet cables may also be deployed in this exemplary network. In this exemplary embodiment, each infrastructure, e.g., building, has an antenna 144, 142 that is adapted to operably receive and transmit data between these two LANS 180, 190. Data communicated between these two LANS and within each LAN, for example, may include, but are not limited to, music, streaming videos, files, voice, databases, text files, control commands, and network keys. This exemplary network 100 may also include other wired, e.g., Ethernet, or wireless network segments. In this exemplary embodiment, the devices in the network 100 may function as a client and/or server, typically depending on what functions the device or application is currently performing. For example, the digital media server 160 may function as a server to the computer 170, while the digital media player 140 may function as a client to the set-top box 110. In another exemplary embodiment, the camera 154 functions as a server, while the computer 124 functions as a client, e.g., player. Although the embodiments of the invention are herein exemplified and discussed using these exemplary networks and devices, features of the present invention are also relevant to other networks—wired, wireless, or combinations thereof, and other networks that transmit using other network protocols. Other devices may also be deployed in the network, including information appliances used in smart home technologies. The embodiments of the present invention may also apply to power line communication networks and those deploying BLUE TOOTH™ technology. The use of this exemplary network configuration is intended to aid in understanding the features of the several embodiments of the invention.

Figure 2:
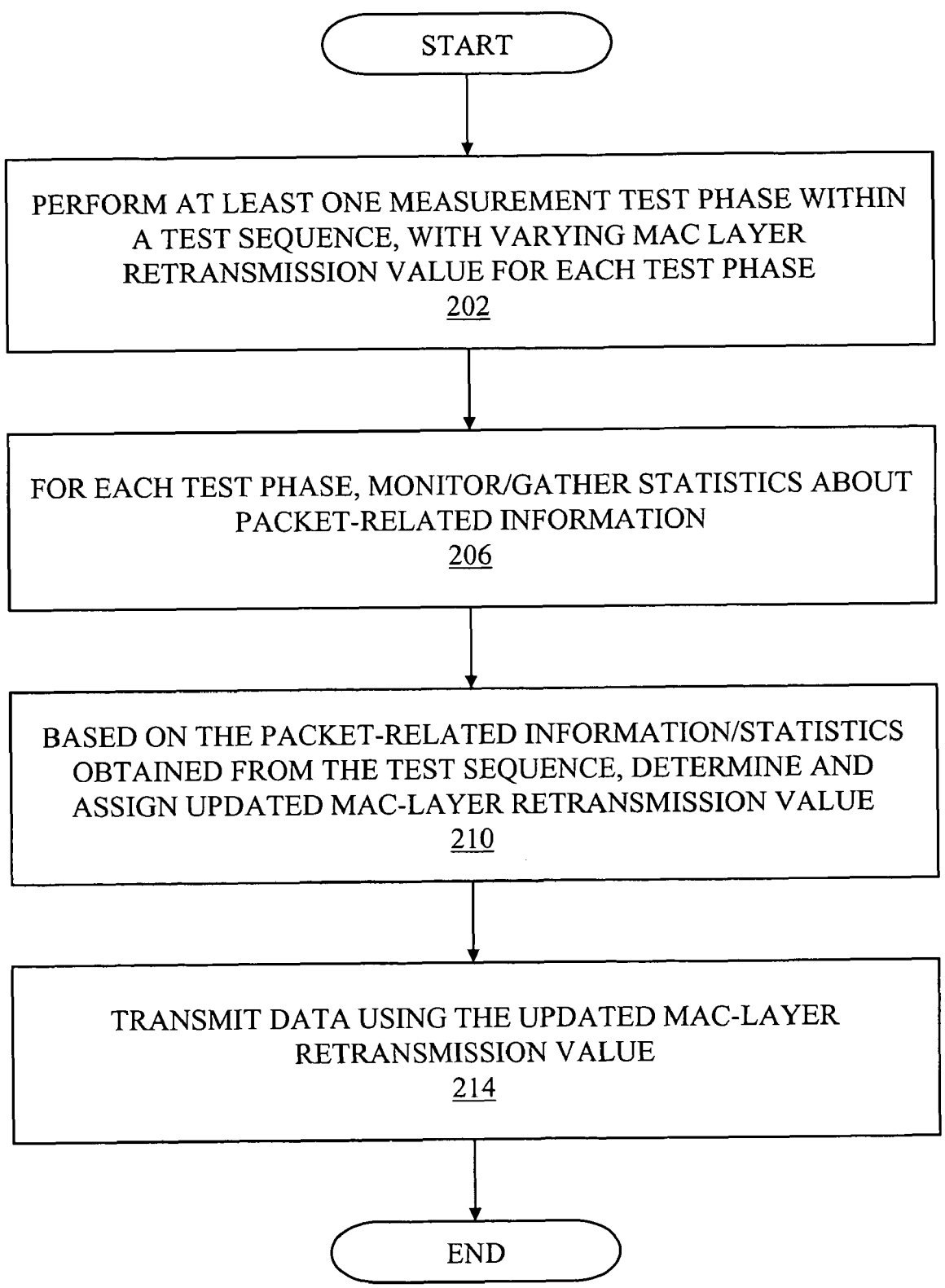
FIG. 2 is a high-level flow diagram showing how the dynamic adaptation technique may be employed according to exemplary embodiments of the present invention.

FIG. 2 is a high-level flowchart showing exemplary operations of how the features of the various embodiments of the invention may be employed. In the first operation, the server and the client within the network 100 perform a test sequence that typically includes one or more packet-measurement test phases (step 202). Each test phase typically has a corresponding or is associated with a MAC-layer retransmission value that is being tested. Each test phase is also typically distinguishable or may be delineated from other test phases, for example, by a start and an end indicator, which may be transmitted or sent by a server. Each measurement test phase typically involves sending packets from the server to the client, as well as retransmitting packets based on the MAC-layer retransmission value being tested during that measurement phase. Depending on the capabilities supported in the device or application, for example, the test sequence may test all the supported MAC-layer retransmission values or portions, thereof. For example, a device adapted to support up to an "M" MAC-layer retransmission values, where in this example, "M" is set to four, is able to support four test phases, i.e., MAC-layer retransmission values of one ("1") through four ("4"). In this exemplary embodiment, there may be four measurement test phases within that test sequence.

In the next operation, a device or application, typically the client, monitors and gathers statistics about packet-related information, e.g., packet-receipt information, for each test phase (step 206). Thus, while the testing is being performed, gathering of packet-related information or statistics may also concurrently be performed. Such statistics may include packets lost, never received, and/or packets late.

In the next operation, based on the packet-related information gathered on the various measurement or test phases within the test sequence, an updated MAC-layer retransmission value is determined (step 210). This updated MAC-layer retransmission value may be based on certain conditions, for example, the number of packets lost, late packets, and/or packets never received. One of ordinary skill in the art will appreciate that such determination of the MAC-layer retransmission value may be done in a number of ways. For example, such determination may be done at the end of the test sequence, e.g., after the end of the last measurement phase. In other embodiments, the determination of the MAC-layer retransmission value may be determined incrementally during the test sequence, for example, by comparing the packet-related information obtained from a previous measurement phase and that obtained from a recent measurement phase, and incrementally updating a temporary MAC-layer retransmission value until all the measurement test phases are performed.

Once the MAC-layer retransmission value of the server is updated based on the packet-related information obtained from all the measurement phases of the test sequence, the server may then start transmitting data or packets, including retransmitting packets, based on the determined MAC-layer retransmission value (step 214), thereby providing a manner of improving packet-reception performance within the system 100.

Although the phrase "test sequence" is used in the above description, the steps described may also be performed during the course of regular media data transmission from the server to the client without requiring a separate test phase.

Figure 3:
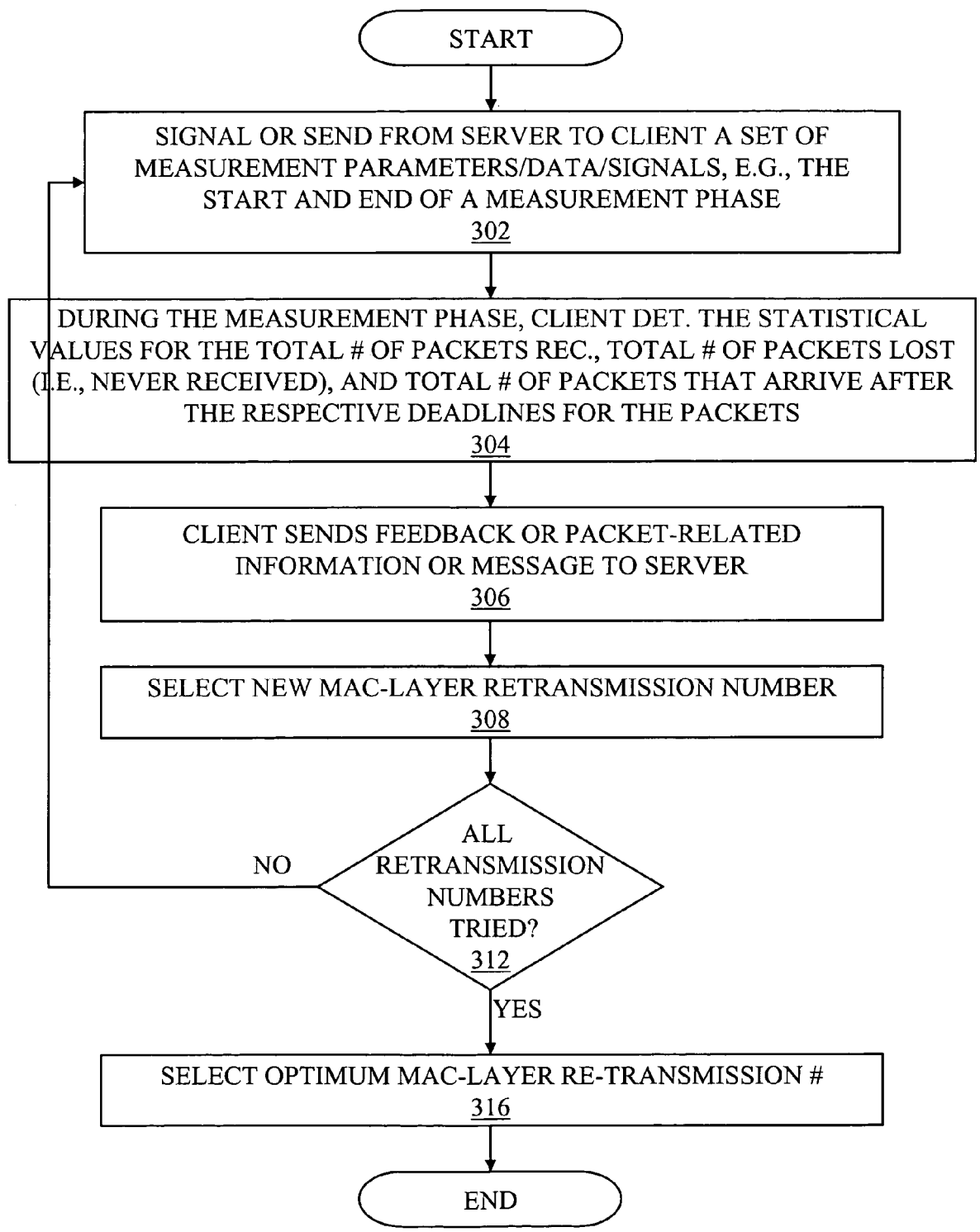
FIG. 3 is a flow diagram of a process for dynamically adjusting the MAC-layer retransmission value on the server side of a server/client system according to an exemplary embodiment of the present invention.

FIG. 3 is another flow diagram of an exemplary process for dynamically adjusting the number of MAC-layer retransmissions on the server side of a server/client system according to an embodiment of the present invention. The process starts at step 302, where the server signals or sends to the client the boundaries of a measurement phase. In some embodiments, this may be performed by having the server transmit a set of one or more test boundary information, parameters or data indicating the start and end of a test measurement phase. In an exemplary embodiment, this set of boundary data may include a start time and an end time of a measurement phase. In other embodiments, the server may send a boundary parameter as an explicit signal, e.g., a bit in a data packet indicating the start of a measurement phase. This explicit signal, in some embodiments, may be sent by the server to the client each time the server changes the number of the test MAC-layer retransmission value. The server may also explicitly signal the end of a measurement phase to the client. Alternatively, the server and client may have an implicit understanding when a measurement phase ends after a measurement phase begins. For example, the server and client may agree using an external technique that each measurement phase will last for Y number of packets (e.g., 1000 packets). As yet another alternative, the server and client may agree that the end of previous measurement phase is signaled by the start of a new measurement phase. In another exemplary embodiment, the set of boundary parameters includes value(s) indicating that the test is to be initiated immediately and with a defined duration. In another embodiment, the set of boundary data may include values indicating that the plurality of test phases within a test sequence are to be performed at a scheduled time or delayed by a certain time period. Various other mechanisms indicating how a measurement phase may be defined and bounded may be utilized and still be in the scope of the present invention.

In one exemplary embodiment, the server may signal the start and end of a measurement phase using any protocol. For example, the server could use the real-time streaming protocol (RTSP) SET_PARAMETER method to signal the real-time transport protocol (RTP) sequence number to signal when a measurement phase starts and/or ends. An exemplary request-response transaction between an RTSP-based server and an RTSP-based client for signaling the start and end of a measurement period is set forth below:

The server sends to the client the following exemplary RTSP SET_PARAMETER request:
SET_PARAMETER rtsp://192.168.0.1/csession RTSP/1.0
Cseq: 880
Content-Type: text/measurement
Session: 3504-7
Content-Length: xx
Phase: Start
SeqNo: 7323454
MACRx: 2

In response, the client sends to the Server the following exemplary RTSP SET_PARAMETER response:
RTSP/1.0 200 OK
Cseq: 880
Content-Type: text/measurementresp
Session: 3504-7
Content-Length: xx
Phase
SeqNo
MACRx Alternatively, when the RTP payload has not defined the use of a marker bit, the server can set the marker bit in the RTP payload to indicate the start of a measurement phase when signaling the end of a measurement phase is achieved by signaling the start of the next measurement phase, or when the signaling of end of the phase is implicit. Alternatively, an RTP header extension may be defined and used for signaling the start and end of a measurement phase.

At step 304, the client determines and gathers the statistical values for the total number of packets received, the total number of packets lost, e.g., never received, and the total number of packets that arrived after the respective deadlines for the packets during a measurement phase. The statistical values are typically determined for the duration of a measurement phase. The client side may determine and gather the statistics by, for example, keeping track of each packet received. When the RTP protocol is being used, each packet has a 16-bit sequence number field that may be used by the client for counting the number of packets lost, e.g., never received. The client may also count the number of packets that arrived after a deadline based on the arrival time of each packet, the packet timestamp (e.g., 32-bit timestamp field in RTP packets) and the playout deadline for each packet.

At step 306, the client sends a feedback message to the server at the end of a measurement period or measurement phase. The feedback message typically contains packet-receipt information relating to the statistical values determined during that measurement phase. Alternately, the client may send multiple feedback messages to the server during the measurement phase in which each feedback message contains statistical values for each portion of the measurement phase. In particular, the feedback information provided to the server includes information relating to the total number of packets received by the client during that measurement phase, the total number of packets lost, e.g., never received, during that measurement phase, the total number of late packets received by the client based on the playout and/or playback deadline, and the playout and/or playback/presentation deadline in units of time. The total number of packets received information includes the number of late packets, although alternative embodiments may omit information relating to the late packets in the total number of received packets. For some applications, it may be desirable for the client feedback message to include information about the total number of late packets for different deadlines and the respective value of the deadlines. The client may also use real-time control protocol (RTCP), RTSP, or any other protocols to send the feedback information to the server based on an agreement between the server and the client.

Typically, at the end of a measurement phase, the server receives the client feedback. Alternatively, if the client sends feedback messages during a measurement phase, the server combines all the feedback information at the end of a measurement phase. The server uses the information in the client feedback and determines the number of packets that were effectively lost during that measurement phase—based on the total number of packets lost, e.g., never received, and the total number of late packets—with respect to the playout deadline.

In other embodiments, the client may determine the measurement phase that provides the best results, e.g., based on certain defined conditions, such as the least number of packets lost, which may or may not include packets received late. The measurement phase number or index—e.g., it is the fifth measurement phase thus measurement phase number five ("5"), is then transmitted to the server, which is then able to correlate the measurement phase number to a certain MAC-layer retransmission value. In another embodiment, the client may directly determine the test MAC-layer retransmission value that provided the best results based on a defined condition. This test MAC-layer retransmission value may then be sent directly by the client to the server, without having the server analyze the statistical packet-related information or feedback provided by the client. In some embodiments, this may be achieved by having the server transmit the MAC-layer retransmission value being used at that measurement phase as part of its boundary data sent to the client. Other variations of this step are expected and yet be in the scope of the present invention.

At step 308, the server side selects a different value for the number of MAC-layer retransmissions based on the number of packets that were effectively lost during the measurement phase. At decision step 312, the server determines whether all MAC-layer retransmission number values have been used for a predetermined range of MAC-layer retransmission numbers. In other embodiments, the server or client may decide specific MAC-layer retransmission numbers or ranges of numbers to be tested. If, at step 312, all of the MAC-layer retransmission numbers have not been used, logic flow typically continues to step 302 where the process of signaling a measurement phase and receiving client feedback messages is repeated.

If, at step 312, all of the MAC-layer retransmission numbers have been used, the logic flow continues to step 316 where the server typically determines the optimal setting for the number of MAC-layer retransmissions by choosing the value that resulted in the smallest effective number of packets lost during the measurement phases. The server may use various techniques for determining the optimal MAC-layer retransmission value based on the current channel conditions and the current playout deadline. For example, the server may sweep through all possible numbers of MAC-layer retransmission values that are supported and based on each corresponding measurement phase, select the value for the MAC-layer retransmissions number that results in the smallest effective number of packets lost.

Alternatively, when the server is currently using a particular value N for the number of MAC-layer retransmissions, the server may obtain the effective number of packets lost at the client by increasing and decreasing the number of MAC-layer retransmissions by a predetermined amount X. Accordingly, when the current number of MAC-layer retransmissions are set to N, the server may conduct a measurement phase for value of N+X and N−X. Based on the results, the server may then select whether to increase N, decrease N or keep N unchanged. The first time adaptation is performed, the server may start using a value N that is based on a priori knowledge or could start with a randomly selected value. As yet another alternative, the server—or client, depending on implementation, may use any other well-known search algorithm for determining the optimum value for the MAC-layer retransmission number.

The dynamic-adaptive technique of the present invention performs best when all the measurement phases occur while network conditions are similar, that is, not drastically varying. This may be achieved by setting the measurement phase duration appropriately. For example, when the length of each measurement phase is based on a predetermined number of packets, then the value for the predetermined number can be selected accordingly.

The server may run the adaptation phase algorithm when the application is started for the first time, thereby allowing the appropriate number of MAC-layer retransmissions to be set based on the particular application and the user requirements. Afterwards, when the application is running, the server may start an adaptation phase for dynamically adjusting the number of MAC-layer retransmissions periodically, based on the number of late and/or lost packets, based on certain conditions, and/or when dynamic adaptation is specifically requested by the client. When the client feedback information indicates an increased number of late and/or lost packets in comparison to previous feedback information, or in comparison to a predetermined threshold, e.g., a percentage of lost packets and/or a percentage of late packets, the server may decide to adapt an updated MAC-layer retransmission value. Dynamic adaptation based on a specific client request may also occur under user control, for example, when a user is experiencing unsatisfactory performance of an AV streaming application.

The dynamic-adaptation technique of the present invention was simulated using the NS2 network simulator. NS2 is an exemplary discrete event simulator targeted at networking research. Details of the NS2 network simulator may be found at the Network Simulator (NS2) website, e.g., the World Wide Web at isi.edu/nsnam/ns. The simulation scenario consisted of four wireless network nodes 0 3. The network traffic from node 0 and node 1 consisted of a CBR source sending UDP data packets that started at 1 second and stopped at 121 seconds, and had a bit rate of 3 Mbps and a packet size of 1000 bytes. The network traffic also included a file transport protocol (FTP) cross-traffic from node 2 to node 3 that was a 1 MB file that started transmission at 5 seconds. The CBR source represented AV media stream. The small cross-traffic simulated interference on the network that may cause a CBR data packet becoming lost and which could result in the number of MAC-layer retransmissions having an adverse impact on the number of effectively lost packets with respect to the playout deadline. The simulation was repeated for a different MAC retransmission value, i.e., the measurement phase of the present invention was performed for a number of MAC-layer retransmission values.

Figure 4:
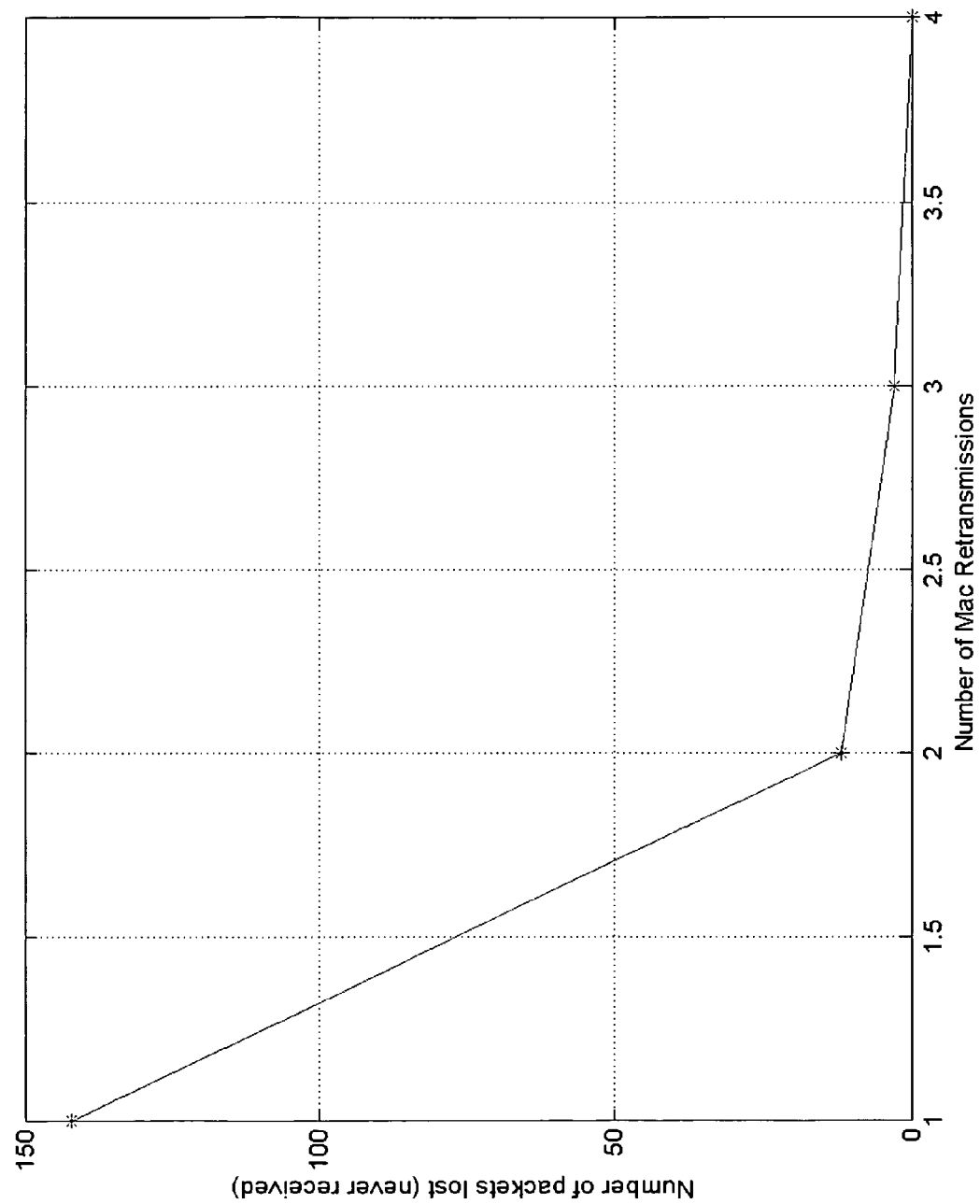
FIG. 4 is a graph depicting exemplary simulation results for the total number of packets lost (i.e., never received) at the a client node for a Constant Bit Rate (CBR) stream sent from a server node.

FIG. 4 is a graph depicting simulation results for the total number of packets lost (i.e., never received) at the node 1 for the CBR stream sent from node 0, as a function of MAC-layer retransmission value or number. As can be seen from FIG. 4, the total number of packets lost decreases as the MAC retransmission value increases.

Figure 5:
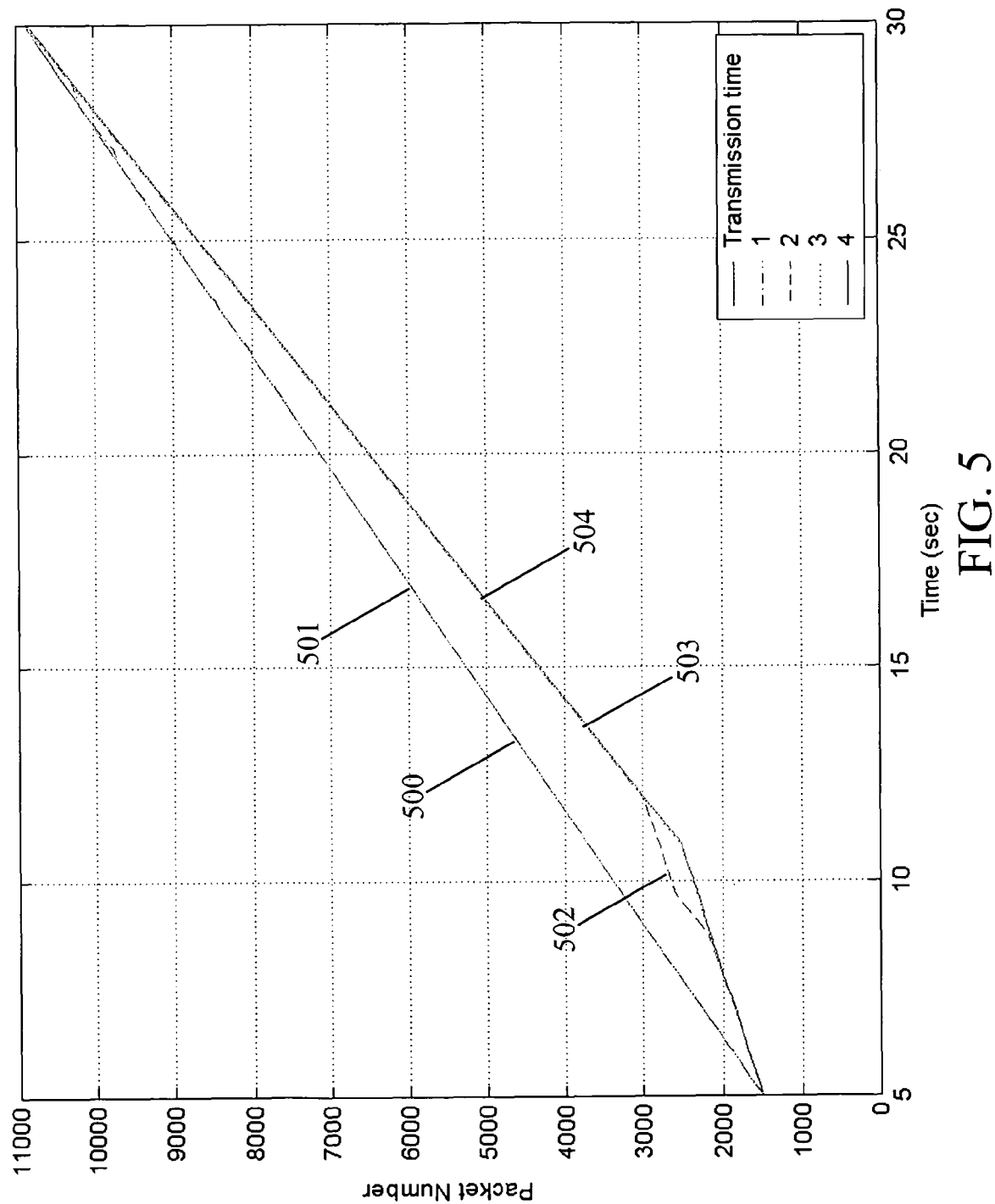
FIG. 5 is a graph depicting exemplary simulation results for the transmission time (from a server node) and the respective reception times (at a client node) for packets for different MAC-layer retransmission values.

FIG. 5 is a graph depicting simulations results for the transmission time 500 (from node 0) and the respective reception times (at node 1) for packets for different MAC-layer retransmission values. In particular, FIG. 5 shows the reception time for packets during the time of the cross-traffic between node 2 and node 3, which started at 5 seconds. The different reception times for the different MAC-layer retransmission values are indicated by reference numerals 501-504, which respectively represent MAC-layer retransmission values of one through four. As may be observed from FIG. 5, the reception delay increases during the time of the cross-traffic. As shown, the graph lines 500, 501, associated with transmission time and MAC-layer retransmission value of one or "1," are very close or near to each other, while the graph lines 503, 504 associated with MAC-layer retransmission values of three or "3" and four or "4" also are very close to each other. The graph line associated with MAC-layer retransmission value of "3" 502 is generally close to the other two graph lines 503, 504, as shown, except for the small area around the 10 seconds x-axis area.

Figure 6:
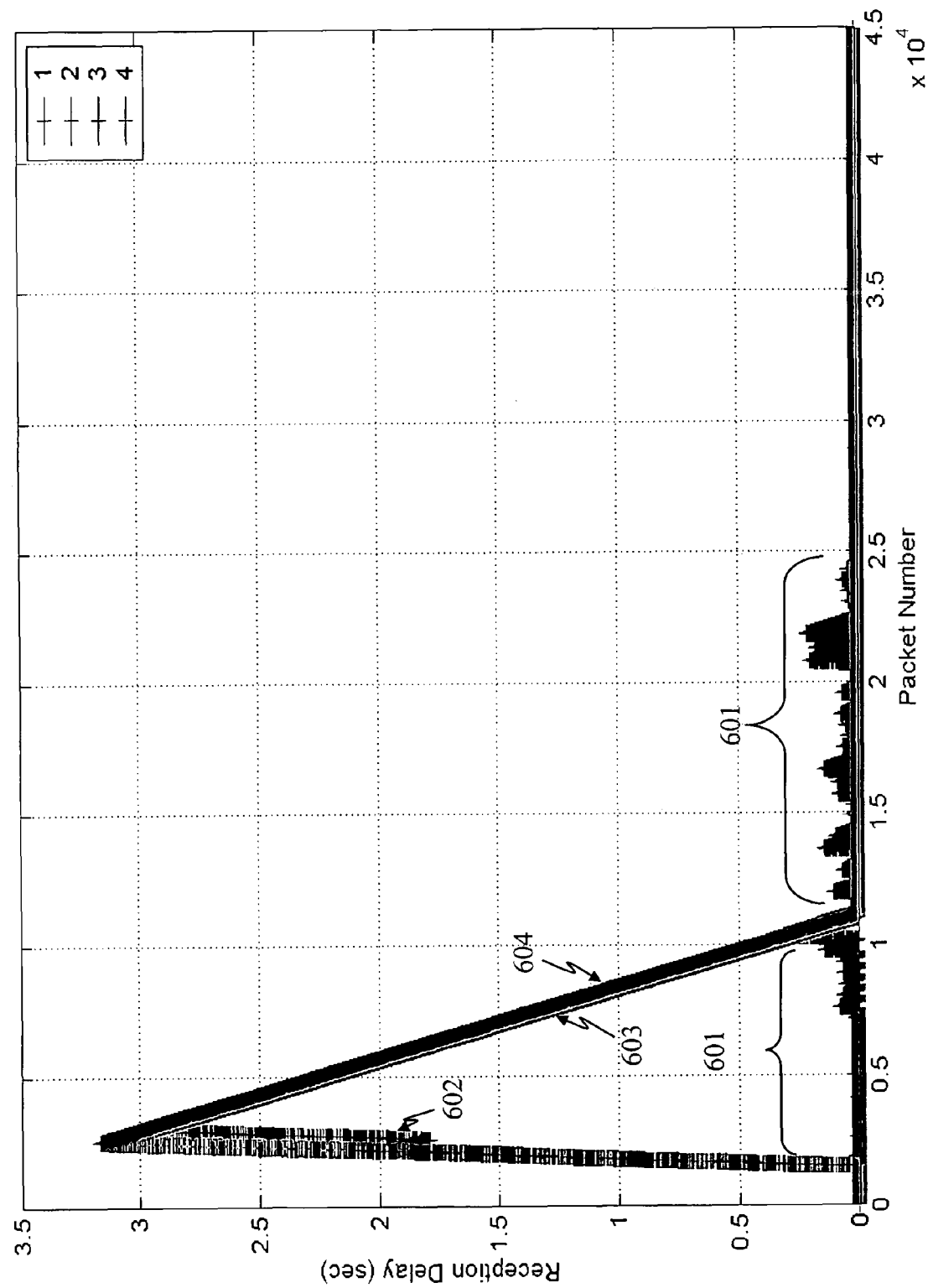
FIG. 6 is a graph depicting exemplary simulation results for the reception delay for the different MAC-layer retransmission values.

FIG. 6 is a graph depicting simulations results for the reception delay for the different MAC-layer retransmission values. Curves or data areas 601-604 respectively represent the reception delays for MAC-layer retransmission values of "1" through "4." FIG. 6 shows an increased reception delay for packets during the cross-traffic period.

Figure 7:
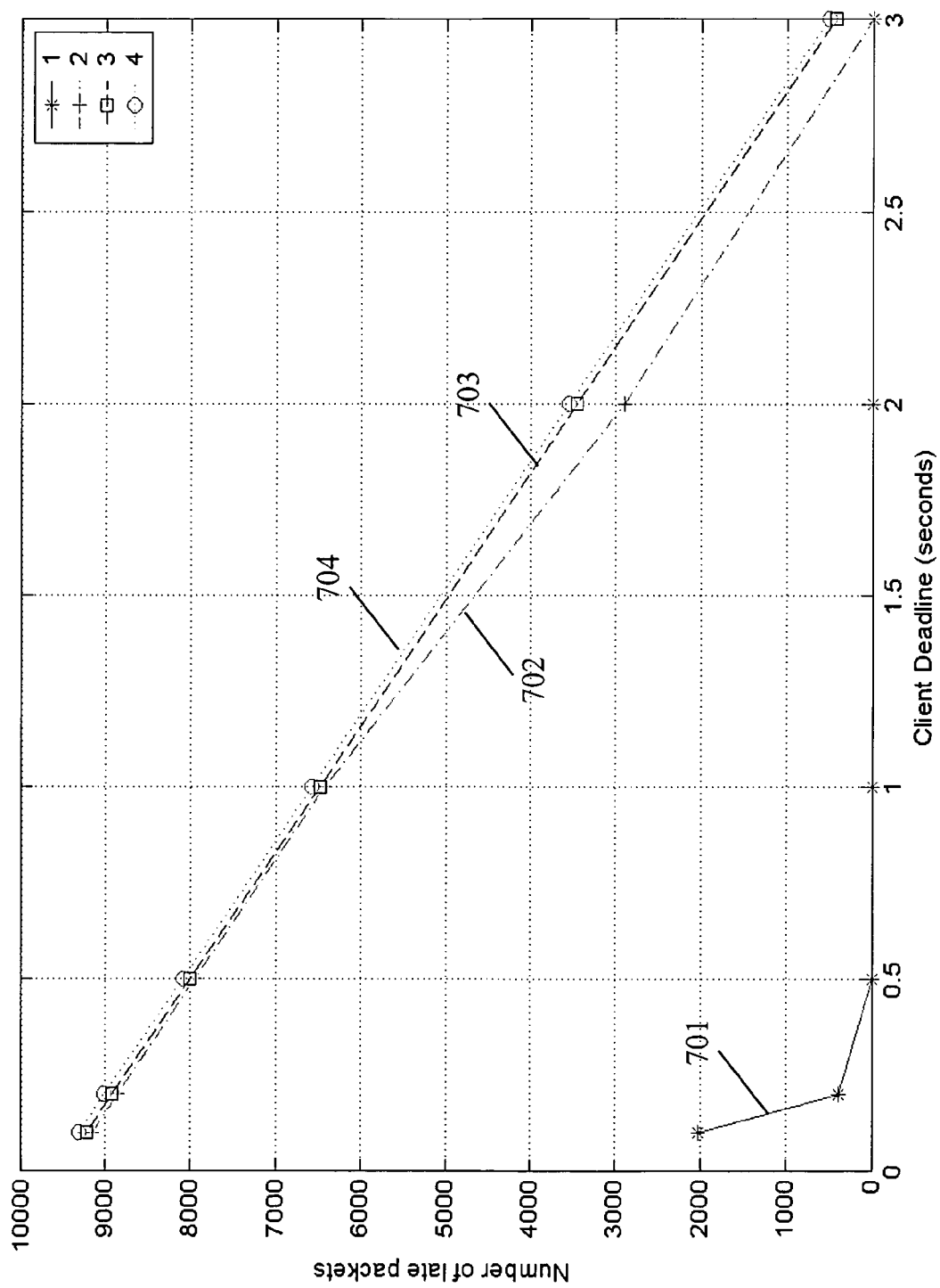
FIG. 7 is a graph depicting exemplary simulation results for the number of late packets as a function of the client deadline for different MAC-layer retransmission values.

FIG. 7 is a graph depicting simulations results for the number of late packets as a function of the client deadline for different MAC-layer retransmission values. The four curves or lines 701-704 respectively represent the number of late packets for MAC-layer retransmission values of "1" through "4." The different values for client deadlines correspond to different client buffer delays or different client buffer sizes. As may be seen in FIG. 7, the number of late packets decreases as the client deadline increases, which is caused because a larger value for a client deadline provides an opportunity for more packets to arrive before their corresponding deadlines. Additionally, the number of late packets increases as the setting for the MAC-layer retransmission value increases.

Figure 8:
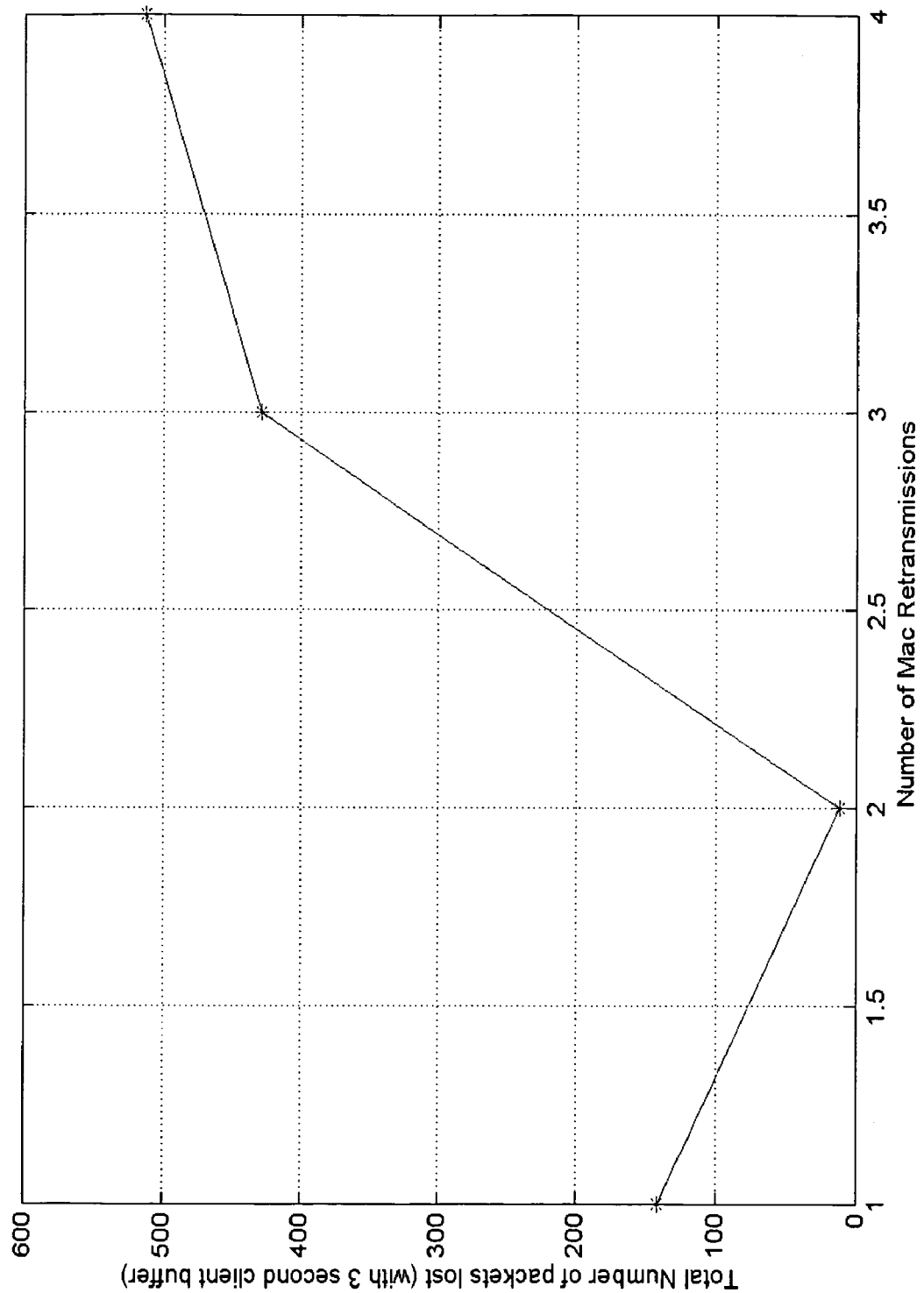
FIG. 8 is a graph depicting exemplary simulation results for the total number of packets lost, i.e., both the packets actually lost (i.e., never received) and the packets that arrived later than the client deadline.

FIG. 8 is a graph depicting simulations results for the total number of packets effectively lost, i.e., both the packets actually lost (i.e., never received) and the packets that arrived later than the client deadline. The client deadline that was used was three (3) seconds, which enabled more late packets to arrive before the deadline and, thus, would not be counted as lost. As may be seen from FIG. 8, for the particular scenario, the network characteristics, the CBR bit-rate and the cross-traffic, the optimal number of MAC-layer retransmission value was two ("2"), as this value resulted in the lowest number of packets that were effectively lost.

Figure 9:
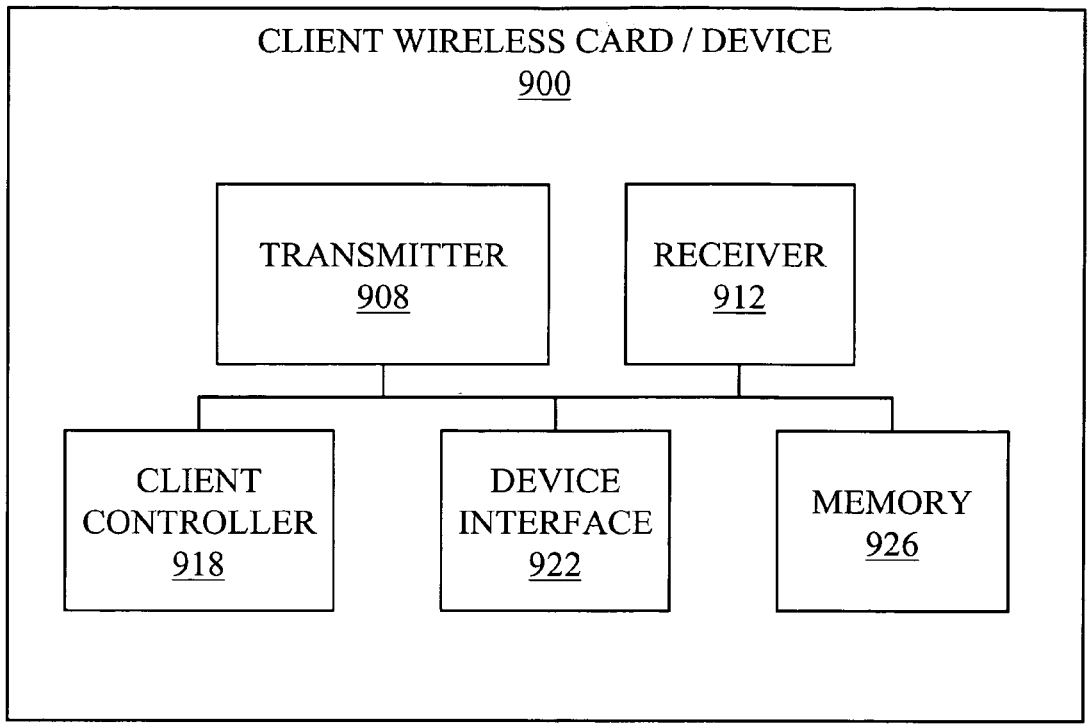
FIG. 9 is a high-level functional block diagram of an exemplary client device according to an embodiment of the invention.

FIG. 9 is a functional block diagram of an exemplary client device that embodies the various features of the present invention. In some embodiments, such device is a wireless network card or adapter 900, which may include a transmitter 908, a receiver 912, a client controller 918, an interface 922, and a memory 926. The client controller 918 typically contains the processing logic, e.g., hardware, software, or both, that in conjunction with the server device performs the dynamic adaptive MAC-layer retransmission adjustment technique of the present invention. Depending on system design and implementation, the modules or logic processing on the client controller 918 may be different from one system and another. For example, if the system 100 is designed such that the server sends, as part of its set of boundary data an explicit start and/or end signal, i.e., the start and end a measurement phase, the client controller 918 is then designed to accept such parameters or signals and accordingly process these data according to the features of the several embodiments of the present invention. Similarly, if a measurement phase is measured by a number of packets and a signal indicating that the measurement phase is going to start within one second, the client controller 918 is then configured to appropriately receive and accordingly process such data. The client controller module 918 also typically controls the activities of the other modules. The transmitter module 908 and the receiver module 912 typically enable the client device 900 to transmit packets and receive packets, respectively. The exemplary network device of the present invention may also be incorporated, for example, within a computer. In such an example, the device interface module 922 includes logic and functional capabilities such that the exemplary network card 900 may operably communicate with the computer and the network, in general. The memory 926 may include volatile and non-volatile memory, which in some embodiments may be used to store feedback information or deadline delays pertinent to the client device. The features of the present invention, however, may also be used for wired devices. Typically, the various modules 908, 912, 918, 922, 926 interface with each other, e.g., via a bus.

Figure 10:
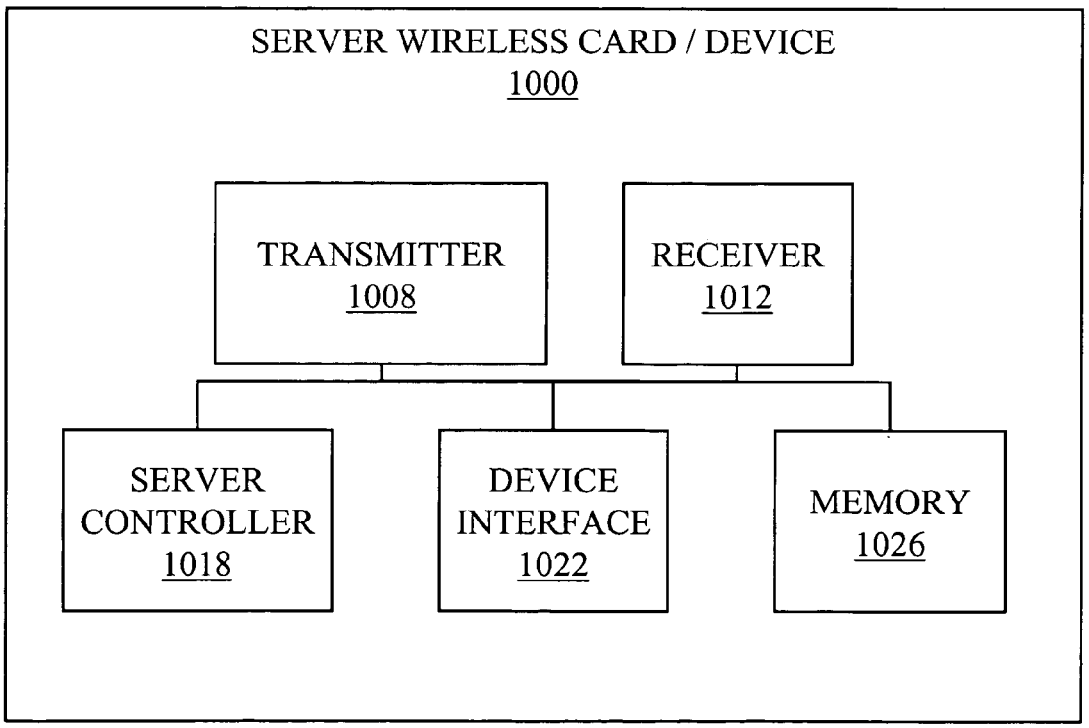
FIG. 10 is a high-level functional block diagram of an exemplary server device according to an embodiment of the invention.

FIG. 10 is a functional block diagram of an exemplary server device that embodies the various features of the present invention. In some embodiments, such device is a wireless network card or adapter 1000, which may include a transmitter 1008, a receiver 1012, a server controller 1018, an interface 1022, and a memory 1026. The server controller 1018 typically includes the processing logic, e.g., hardware, software, or both, that in conjunction with the client device performs the dynamic adaptive MAC-layer retransmission adjustment technique of the present invention. Depending on system design and implementation, the modules or logic processing on the server controller 1018 may be different from one system and another, as discussed above. The transmitter module 1008 and the receiver module 1012 typically enable the server device 1000 to transmit packets and receive packets, respectively. The exemplary network device of the present invention may also be incorporated, for example, within a digital media server. In such an example, the device interface module 1022 includes logic and functional capabilities such that the exemplary network card 1000 may operably communicate with the digital media server and the network, in general. The memory 1026 may include volatile and non-volatile memory, which in some embodiments may be used to store packet-receipt related information, statistics, and MAC-layer retransmission values. The features of the present invention, however, may also be used for wired devices. Typically, the various modules 1004, 1008, 1012, 1018, 1022, 1026 interface with each other, e.g., via a bus.

It should be understood that the different components forming the functionality of the present invention could be associated with a server application/device and/or a client application/device and/or on a third entity. Furthermore, the various modules in FIGS. 9 and 10 may be further subdivided, if appropriate, or be combined into one or more modules, as those of ordinary skill in the art will realize.

Although the foregoing invention has been described in some detail for purposes of clarity of understanding, it will be apparent that certain changes and modifications may be practiced that are within the scope of the appended claims. For example, variations on the order of steps may be varied without deviating from the spirit of the invention. Accordingly, the present embodiments are to be considered as illustrative and not restrictive, and the invention is not to be limited to the details given herein, but may be modified within the scope and equivalents of the appended claims.

I claim:

1. A system comprising:
a server comprising a processor configured to:
transmit to a client packets during each of a two or more measurement phases of a measurement test sequence, wherein a number of transmissions of the measurement phase is represented by a respective trial media access control (MAC)-layer retransmission value from a plurality of trial MAC-layer retransmission values, wherein the respective trial MAC-layer retransmission value is based on the number of transmissions for the at least two measurement trial phases, and wherein the measurement trial sequence comprises the server further adapted to retransmit to the client, one or more trial frames at the MAC-layer as many times as a first MAC-layer retransmission value;
receive feedback information associated with each respective measurement phase, wherein the feedback information comprises: (a) a total number of packets never received during the measurement phase, and (b) a total number of packets that arrived after the measurement at a client during the associated measurement;
determine an updated MAC-layer retransmission value based on comparing the received feedback information determined at the client for each of the two or more trial MAC-layer retransmission values, comprising a fewest number of packets lost or late arriving during an associated measurement phase; and
transmit data packets based on the determined updated MAC-layer retransmission value;
at least one network segment; and
the client operably coupled to the server via the at least one network segment, the client comprising a processor configured to:
determine feedback information related to packets transmitted by the server, wherein the determined information comprises a total number of packets never received by the client during an associated measurement phase and a total number of packets that arrived after the measurement phase; and
transmit the determined feedback information.

2. The system of claim 1, wherein the server processor is further configured to transmit information indicating a start and an end of a measurement phase.

3. The system of claim 2, wherein the server processor is further configured to transmit information indicating a start and an end of a measurement phase applying at least one of the following:
real-time streaming protocol (RTSP); and
real-time transport protocol (RTP).

4. A method of determining an optimal MAC-layer retransmission value on a server side of a server-client system, the method comprising:
establishing a measurement phase deadline, a plurality of trial MAC-layer retransmission values, and a plurality of measurement phases, wherein each trial MAC-layer retransmission value is associated with a measurement phase of the plurality of measurement phases;
for each of the two or more measurement phases:
selecting a trial MAC-layer retransmission value not previously selected from the plurality of trial MAC-layer retransmission values;
transmitting, by a server device to a client device and during a measurement phase associated with the selected trial MAC-layer retransmission value, the measurement phase deadline, a set of packets, and one or more retransmissions of the set of packets, wherein the one or more retransmissions are as many times as the selected trial MAC-layer retransmission value;
determining, by a client device and during the measurement phase associated with the selected trial MAC-layer retransmission value, feedback data comprising: (a) a total number of packets never received during the measurement phase, and (b) a total number of packets that arrived after the measurement phase deadline; and
transmitting, by the client device to the server device, the determined feedback data; and
determining the optimal MAC-layer retransmission value from the selected trial MAC-layer retransmission values based on comparing the determined feedback data of each selected trial MAC-layer retransmission value.

5. A method of determining a MAC-layer retransmission value on a server side of a server-client system, the method comprising:
establishing a measurement phase deadline, a plurality of trial MAC-layer retransmission values, and a plurality of measurement phases, wherein each trial MAC-layer retransmission value is associated with a measurement phase of the plurality of measurement phases;
for each of the two or more measurement phases:
selecting a trial MAC-layer retransmission value not previously selected from the plurality of trial MAC-layer retransmission values;
transmitting, by a server device to a client device and during a measurement phase associated with the selected trial MAC-layer retransmission value, the measurement phase deadline, a set of packets, and one or more retransmissions of the set of packets, wherein the one or more retransmissions are as many times as the selected trial MAC-layer retransmission value;
determining, by a client device and during the measurement phase associated with the selected trial MAC-layer retransmission value, feedback data comprising: a total number of packets never received during the measurement phase and a total number of packets that arrived after the measurement phase deadline; and transmitting, by the client device to the server device, the determined feedback data; and determining the MAC-layer retransmission value from the selected trial MAC-layer retransmission values based on comparing the determined feedback data of each selected trial MAC-layer retransmission value.

* * * * *